US008649343B2

(12) United States Patent
Ahn et al.

(10) Patent No.: US 8,649,343 B2
(45) Date of Patent: Feb. 11, 2014

(54) UPLINK TRANSMISSION IN CARRIER AGGREGATION ENVIRONMENT

(75) Inventors: Joon Kui Ahn, Anyang-si (KR); Jung Hoon Lee, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 230 days.

(21) Appl. No.: 13/141,654

(22) PCT Filed: Dec. 23, 2009

(86) PCT No.: PCT/KR2009/007709
§ 371 (c)(1),
(2), (4) Date: Jul. 12, 2011

(87) PCT Pub. No.: WO2010/074500
PCT Pub. Date: Jul. 1, 2010

(65) Prior Publication Data
US 2011/0261776 A1 Oct. 27, 2011

Related U.S. Application Data

(60) Provisional application No. 61/140,082, filed on Dec. 23, 2008.

(30) Foreign Application Priority Data

Dec. 4, 2009 (KR) .................. 10-2009-0119746

(51) Int. Cl.
H04W 4/00 (2009.01)
(52) U.S. Cl.
USPC ........................................ 370/329
(58) Field of Classification Search
USPC ......... 370/230, 229, 235, 252, 208, 203, 332, 370/330, 463, 329; 455/73, 450, 458; 375/260, 316
See application file for complete search history.

(56) References Cited

U.S. PATENT DOCUMENTS 8,031,688 B2 * 10/2011 Papasakellariou et al. ... 370/344
8,412,209 B2 * 4/2013 Whinnett et al. ............. 455/450

(Continued)

FOREIGN PATENT DOCUMENTS

CN 1631015 A 6/2006
CN 101005343 A 7/2007

(Continued)

OTHER PUBLICATIONS

Nokia, "L1 control signaling with carrier aggregation in LTE-Advanced", 3GPP TSG-RAN WG1 Meeting #54bis, Sep. 29-Oct. 3, 2008, R1-083730, 6 pages.

Primary Examiner — Abdullah Riyami
(74) Attorney, Agent, or Firm — Birch, Stewart, Kolasch & Birch, LLP

(57) ABSTRACT

The present invention relates to a wireless communication system, and more particularly, to a method of uplink transmission, in which a user equipment transmits a signal in uplink in a wireless communication system. The present invention includes switching an uplink transmission mode used in transmitting the signal to a base station to either a first transmission mode or a second transmission mode, generating a plurality of signals to transmit to the base station via a plurality of component carriers (CCs), and transmitting a plurality of the signals to the base station according to the switched uplink transmission mode, wherein the first transmission mode allows multi-carrier characteristics for the signal transmitted via a plurality of the component carriers and wherein the second transmission mode requests single carrier characteristics for the signals transmitted via a plurality of the component carriers.

8 Claims, 13 Drawing Sheets (a) Single carrier mode per whole UL CCs (MIMO)

(b) Single carrier mode per UL CC group (MIMO case)

* PUSCH may be generated for carrying multiplexed control information only

(56) References Cited

U.S. PATENT DOCUMENTS

| | | | |
|---|---|---|---|
| 2004/0151108 A1 | 8/2004 | Blasco Claret et al. | |
| 2005/0113023 A1 | 5/2005 | Bassompiere et al. | |
| 2008/0285669 A1 | 11/2008 | Walton et al. | |
| 2008/0305745 A1* | 12/2008 | Zhang et al. | 455/67.11 |
| 2008/0311919 A1* | 12/2008 | Whinnett et al. | 455/447 |
| 2009/0006925 A1* | 1/2009 | Pan | 714/758 |
| 2009/0010240 A1* | 1/2009 | Papasakellariou et al. | 370/344 |
| 2009/0227278 A1* | 9/2009 | Cho et al. | 455/522 |
| 2009/0268831 A1* | 10/2009 | Onggosanusi et al. | 375/260 |
| 2010/0098012 A1* | 4/2010 | Bala et al. | 370/329 |
| 2010/0118817 A1* | 5/2010 | Damnjanovic et al. | 370/329 |
| 2010/0130218 A1* | 5/2010 | Zhang et al. | 455/450 |
| 2010/0227569 A1* | 9/2010 | Bala et al. | 455/73 |
| 2011/0002322 A1* | 1/2011 | Kim et al. | 370/344 |
| 2011/0141941 A1* | 6/2011 | Lee et al. | 370/252 |
| 2011/0142009 A1* | 6/2011 | Lindoff et al. | 370/332 |
| 2011/0188594 A1* | 8/2011 | Kim et al. | 375/260 |
| 2011/0274099 A1* | 11/2011 | Kwon et al. | 370/338 |
| 2011/0280203 A1* | 11/2011 | Han et al. | 370/329 |
| 2012/0093097 A1* | 4/2012 | Che et al. | 370/329 |

FOREIGN PATENT DOCUMENTS

| | | |
|---|---|---|
| CN | 101242662 A | 8/2008 |
| KR | 10-2004-0008192 A | 1/2004 |

* cited by examiner

E-UMTS

Fig. 2
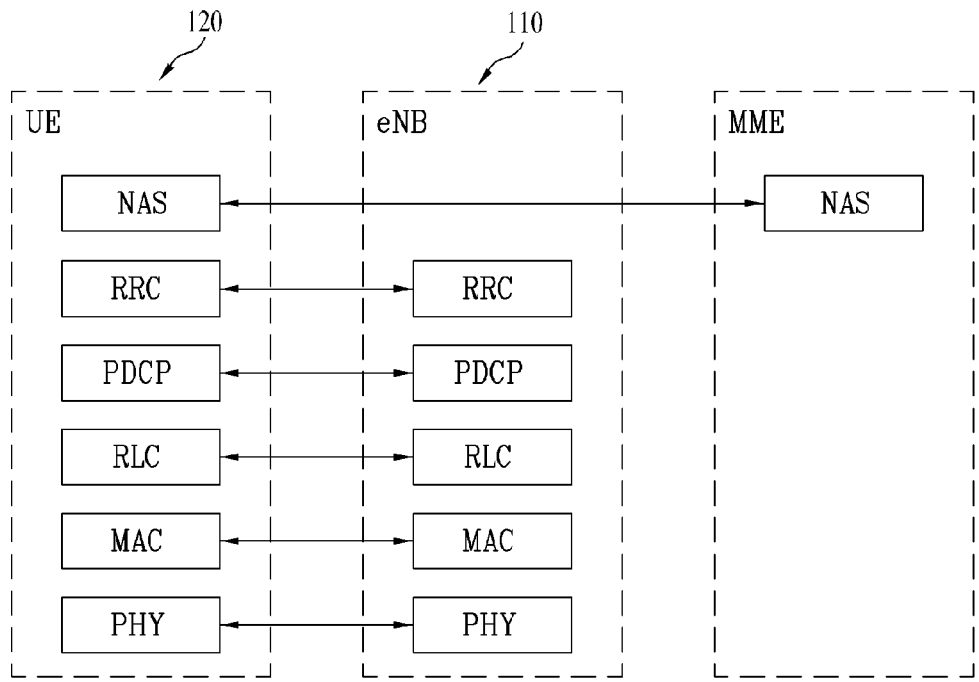
(a) Control-plane protocol stack
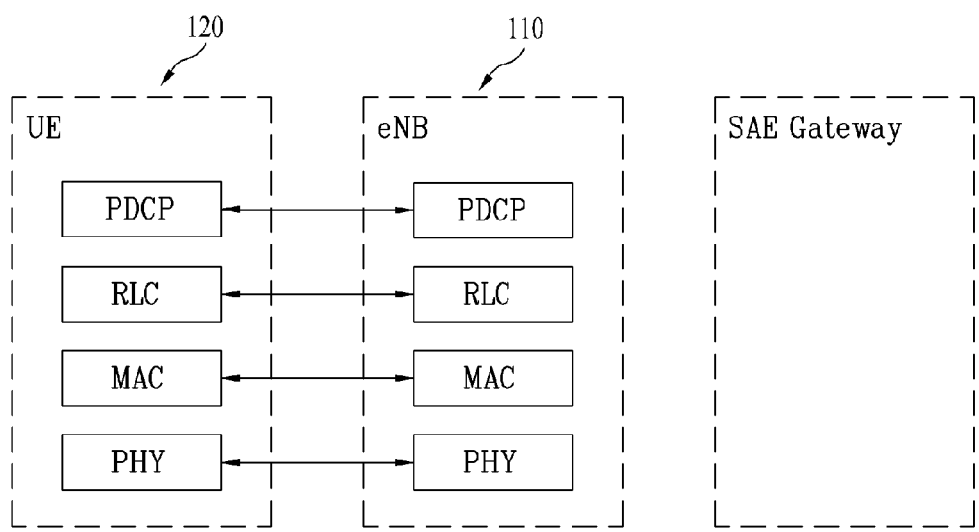
(b) User-plane protocol stack Single component carrier (e.g. LTE system)

Fig. 13
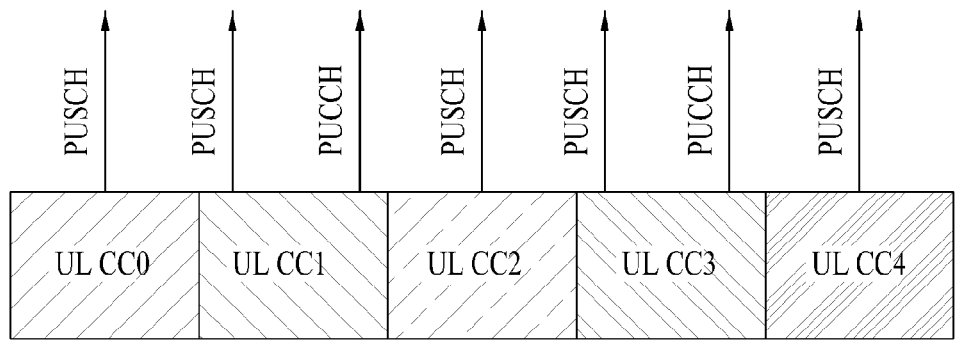
Multi carrier mode per UL CC
Fig. 14
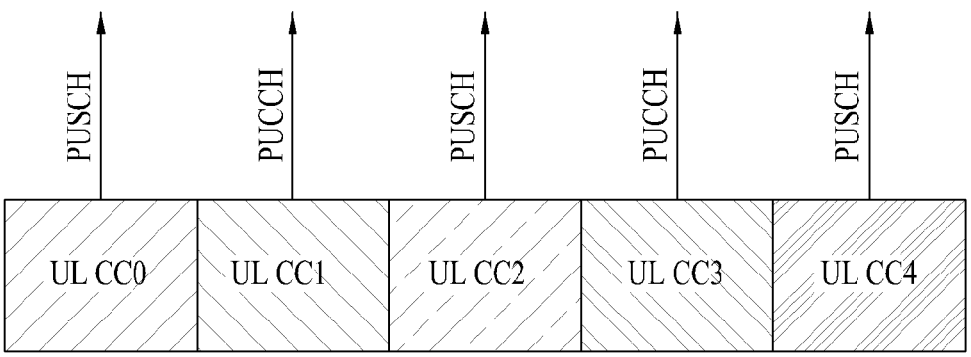
(a) Single carrier mode per UL CC (Case 1)
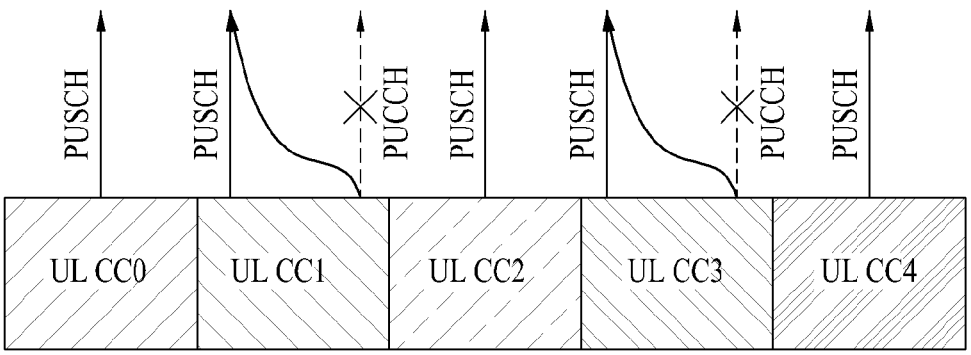
(b) Single carrier mode per UL CC (Case 2)

Fig. 15
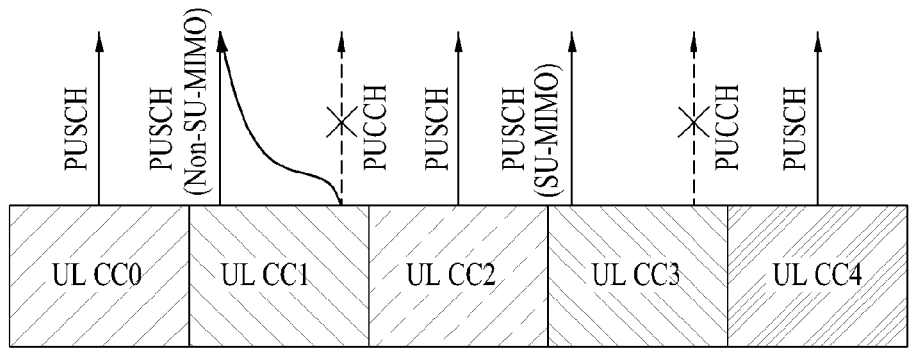
Single carrier mode per UL CC (MIMO Case)
Fig. 16
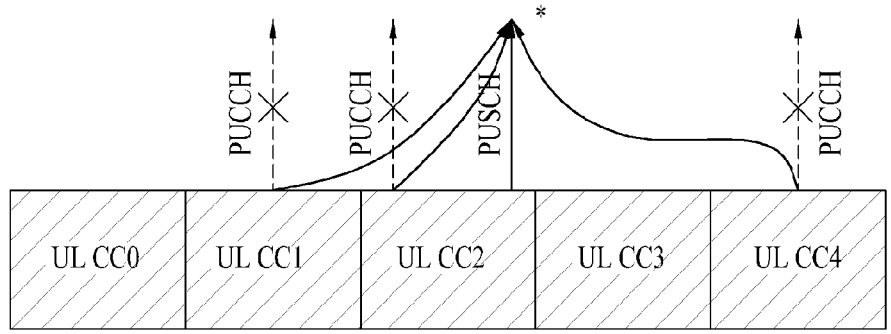
(a) Single carrier mode per whole UL CCs
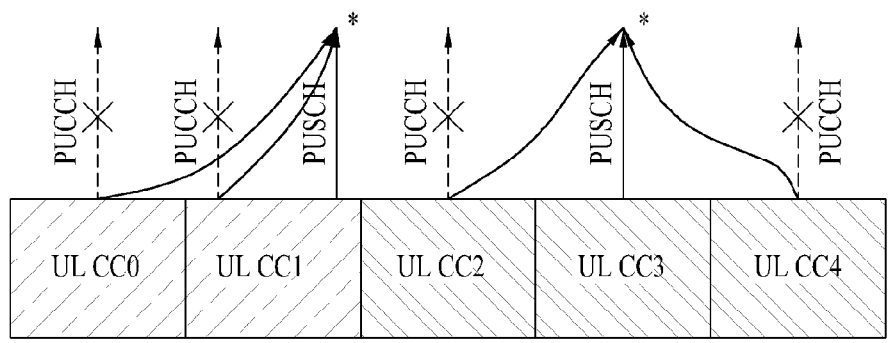
(b) Single carrier mode per UL CC group
\* PUSCH may be generated for carrying multiplexed control information only Fig. 17
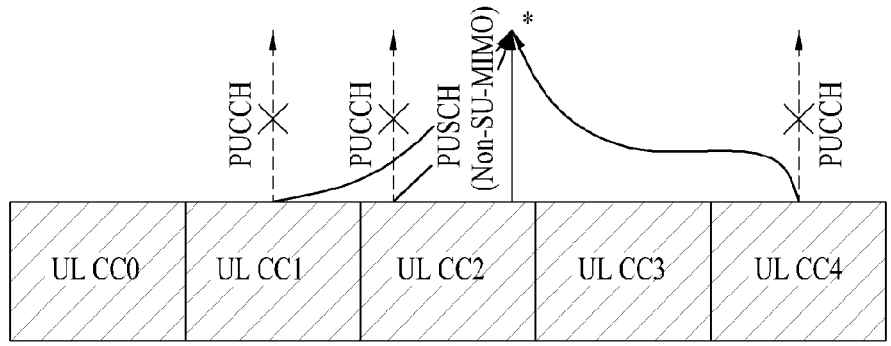
(a) Single carrier mode per whole UL CCs (MIMO)
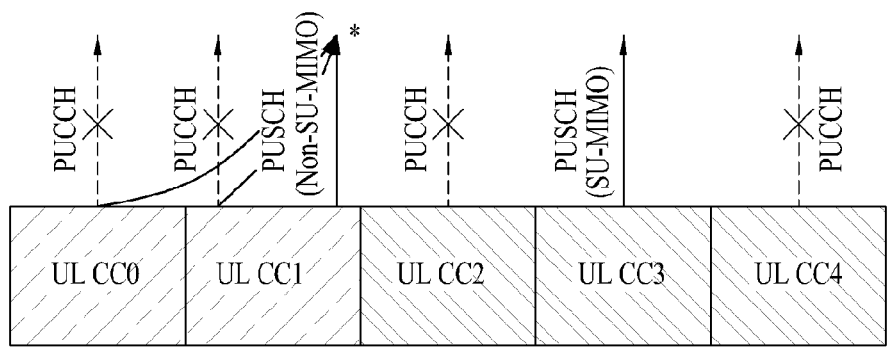
(b) Single carrier mode per UL CC group (MIMO case)
* PUSCH may be generated for carrying multiplexed control information only
Fig. 18
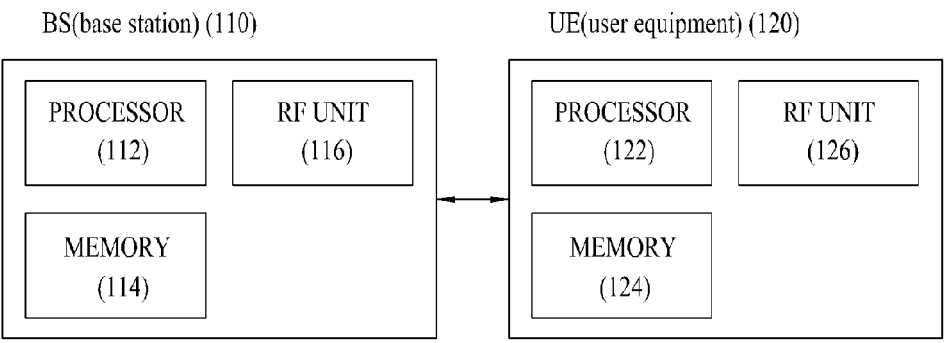

UPLINK TRANSMISSION IN CARRIER AGGREGATION ENVIRONMENT

This application is the National Phase of PCT/KR2009/007709 filed on Dec. 23, 2009, which claims the benefit under 35 U.S.C. 119(e) of U.S. Provisional Application No. 61/140,082 filed on Dec. 23, 2008, and claims priority under 35 U.S.C. 119 (a) to Patent Application No. 10-2009-0119746 filed in Republic of Korea on Dec. 4, 2009, all of which are hereby expressly incorporated by reference into the present application.

TECHNICAL FIELD

The present invention relates to a wireless communication system, and more particularly, to an apparatus for uplink transmission in carrier aggregation environment and method thereof.

BACKGROUND ART

Recently, wireless communication systems are ongoing to be widely and globally developed to provide various kinds of communication services for speech, data and/or the like. A wireless communication system is a multiple access system capable of supporting multi-user communications by sharing available system resources (e.g., bandwidth, transmission power, etc.). For example, the multiple access system includes one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system, MC-FDMA (multi carrier frequency division multiple access) system and the like.

DISCLOSURE OF INVENTION

Technical Problem

Accordingly, the present invention is directed to an apparatus for uplink transmission in carrier aggregation environment and method thereof that substantially obviate one or more of the problems due to limitations and disadvantages of the related art.

An object of the present invention is to provide an apparatus and method, by which uplink transmission can be efficiently performed in a wireless communication system supporting carrier aggregation.

Another object of the present invention is to provide an apparatus and method, by which various uplink transmissions can be performed according to environments, respectively.

A further object of the present invention is to provide an apparatus and method for signaling, by which various uplink transmission schemes can be performed.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

Solution to Problem

To achieve these and other advantages and in accordance with the purpose of the present invention, as embodied and broadly described, a method of uplink transmission, in which a user equipment transmits a signal in uplink in a wireless communication system, includes the steps of switching an uplink transmission mode used in transmitting the signal to a base station to either a first transmission mode or a second transmission mode, generating a plurality of signals to transmit to the base station via a plurality of component carriers (CCs), and transmitting a plurality of the signals to the base station according to the switched uplink transmission mode, wherein the first transmission mode allows multi-carrier characteristics for the signal transmitted via a plurality of the component carriers and wherein the second transmission mode requests single carrier characteristics for the signals transmitted via a plurality of the component carriers.

To further achieve these and other advantages and in accordance with the purpose of the present invention, a user equipment in a wireless communication system includes an RF (radio frequency) unit configured to transceive a radio signal with a base station, a memory configured to store information transceived with the base station and parameters required for operations of the user equipment, and a processor connected to the RF unit and the memory to control the RF unit and the memory for the operations of the user equipment, wherein the processor is configured to perform an uplink transmission method including the steps of switching an uplink transmission mode used in transmitting the signal to a base station to either a first transmission mode or a second transmission mode, generating a plurality of signals to transmit to the base station via a plurality of component carriers (CCs), and transmitting a plurality of the signals to the base station according to the switched uplink transmission mode, wherein the first transmission mode allocates multi-carrier characteristics for the signal transmitted via a plurality of the component carriers and wherein the second transmission mode requests single carrier characteristics for the signals transmitted via a plurality of the component carriers.

Preferably, the uplink transmission mode is switched using information signaled via an RRC (radio resource control) message or a downlink control channel.

Preferably, a plurality of the component carriers construct one of a plurality of component carrier groups included in a whole uplink band.

Preferably, the first transmission mode allows at least two physical channels to be simultaneously transmitted via a plurality of the component carriers.

More preferably, the first transmission mode allows PUSCH (physical uplink shared channel) and PUCCH (physical uplink control channel) to be simultaneously transmitted via the same component carrier.

Preferably, the second transmission mode requests one physical channel to be transmitted via a plurality of the component carriers.

More preferably, the physical channel includes either PUSCH or PUCCH.

To further achieve these and other advantages and in accordance with the purpose of the present invention, a method of uplink transmission, in which a user equipment transmits a signal in uplink in a wireless communication system, includes the steps of generating a plurality of control signals associated with different component carriers (CCs), respectively, multiplexing a plurality of the control signals into a physical channel in a specific uplink component carrier (UL CC), and transmitting a plurality of the control signals via the physical channel in the specific uplink component carrier (UL CC).

To further achieve these and other advantages and in accordance with the purpose of the present invention, a user equipment in a wireless communication system includes an RF (radio frequency) unit configured to transceive a radio signal with a base station, a memory configured to store information transceived with the base station and parameters required for operations of the user equipment, and a processor connected to the RF unit and the memory to control the RF unit and the memory for the operations of the user equipment, wherein the processor is configured to perform an uplink transmission method including the steps of generating a plurality of control signals associated with different component carriers (CCs), respectively, multiplexing a plurality of the control signals into a physical channel in a specific uplink component carrier (UL CC), and transmitting a plurality of the control signals via the physical channel in the specific uplink component carrier (UL CC).

Preferably, each of a plurality of the control signals is scheduled to be transmitted via an originally different uplink component carrier.

Preferably, each of a plurality of the control signals is scheduled to be transmitted via an originally different PUCCH (physical uplink control channel).

Preferably, the physical channel having a plurality of the control signals multiplexed therein includes PUCCH (physical uplink control channel).

Preferably, the physical channel having a plurality of the control signals multiplexed therein includes PUSCH (physical uplink shared channel).

More preferably, the PUSCH is signaled to multiplex a plurality of the control signals only without data.

Preferably, the step of multiplexing a plurality of the control signals into the physical channel in the specific uplink component carrier (UL CC) is performed on whole uplink component carriers.

Preferably, the step of multiplexing a plurality of the control signals into the physical channel in the specific uplink component carrier (UL CC) is performed by an uplink component carrier (UL CC) group unit.

It is to be understood that both the foregoing general description and the following detailed description are exemplary and explanatory and are intended to provide further explanation of the invention as claimed.

Advantageous Effects of Invention

Accordingly, the present invention provides the following effects and/or advantages.

First of all, uplink transmission can be efficiently performed in a wireless communication system supporting carrier aggregation.

Secondly, a user equipment is able to perform various uplink transmission schemes according to environments in case of transmitting uplink data carried on a plurality of component carriers.

Thirdly, signaling can be performed to enable a user equipment to perform various uplink transmission schemes.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 is a diagram illustrating structures of a radio interface protocol between a user equipment and E-UTRAN based on the 3GPP radio access network standard;

FIG. 13 is an exemplary diagram for a case of allowing a multiple carrier characteristic per UL CC;

FIG. 14 is an exemplary diagram for a case of maintaining a single carrier characteristic per UL CC;

FIG. 15 is an exemplary diagram for a case of maintaining a multiple carrier characteristic per UL CC in case of performing uplink transmission via MIMO antenna;

FIG. 16 is an exemplary diagram for a case of maintaining a single carrier characteristic for a plurality of UL CCs;

FIG. 17 is an exemplary diagram for a case of maintaining a single carrier characteristic for a plurality of UL CCs in case of performing uplink transmission via MIMO antenna; and FIG. 18 is a diagram for an example of a base station and a user equipment applicable to one embodiment of the present invention.

MODE FOR THE INVENTION

Reference will now be made in detail to the preferred embodiments of the present invention, examples of which are illustrated in the accompanying drawings.

First of all, embodiments of the present invention are usable for various wireless access technologies including CDMA, FDMA, TFMA, OFDMA, SC-FDMA, MC-FDMA and the like. CDMA can be implemented by such a wireless technology as UTRA (universal terrestrial radio access), CDMA 2000 and the like. TDMA can be implemented with such a wireless technology as GSM/GPRS/EDGE (Global System for Mobile communications)/General Packet Radio Service/Enhanced Data Rates for GSM Evolution). OFDMA can be implemented with such a wireless technology as IEEE 802.11 (Wi-Fi), IEEE 802.16 (WiMAX), IEEE 802.20, E-UTRA (Evolved UTRA), etc. UTRA is part of UMTS (Universal Mobile Telecommunications System). 3GPP (3rd Generation Partnership Project) LTE (long term evolution) is a part of E-UMTS (Evolved UMTS) that uses E-UTRA. LTE-A (LTE-Advanced) is an evolved version of 3GPP LTE.

The following descriptions are made for the case of applying the technical features of the present invention to the 3GPP system, by which the present invention is non-limited.

Figure 1:
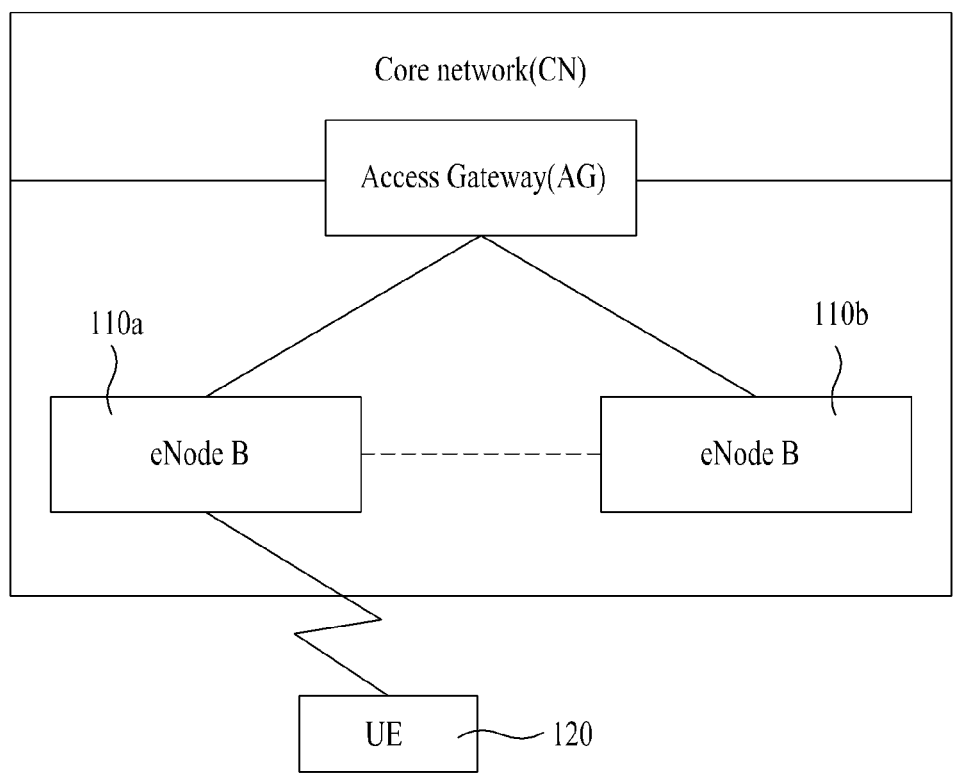
FIG. 1 is a diagram illustrating a network structure of an Evolved Universal Mobile Telecommunications System (E-UMTS)

FIG. 1 is a diagram illustrating a network structure of an Evolved Universal Mobile Telecommunications System (E-UMTS). The E-UMTS may also be referred to as a Long Term Evolution (LTE) system. For details of the technical specifications of the UMTS and the E-UMTS, refer to Release 7 and Release 8 of 3rd Generation Partnership Project; Technical Specification Group Radio Access Network.

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. The base stations can simultaneously transmit multiple data streams for a broadcast service, a multicast service and/or a unicast service. One or more cells may exist for one base station. One cell is set to one of bandwidths of 1.25, 2.5, 5, 10, and 20 Mhz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify information related to time and frequency domains to which data will be transmitted, encoding, data size, and hybrid automatic repeat and request (HARQ). Also, the base station transmits uplink (UL) scheduling information of uplink data to the corresponding user equipment to notify information related to time and frequency domains that can be used by the corresponding user equipment, encoding, data size, and HARQ. An interface for transmitting user traffic or control traffic can be used between the base stations. A Core Network (CN) may include the AG and a network node or the like for user registration of the UE. The AG manages mobility of a UE on a Tracking Area (TA) basis, wherein one TA includes a plurality of cells.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used in the user equipment and the network to manage call. The user plane means a passageway where data generated in an application layer, for example, voice data or Internet packet data are transmitted.

A physical layer as a first layer provides an information transfer service to an upper layer using a physical channel. The physical layer is connected to a medium access control layer above the physical layer via a transport channel. Data are transferred between the medium access control layer and the physical layer via the transport channel. Data are transferred between one physical layer of a transmitting side and the other physical layer of a receiving side via the physical channel. The physical channel uses time and frequency as radio resources. Specifically, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control layer of a second layer provides a service to a radio link control (RLC) layer above the MAC layer via a logical channel. The RLC layer of the second layer supports reliable data transfer. The RLC layer may be implemented as a functional block inside the MAC layer. In order to effectively transmit IP packets such as IPv4 or IPv6 within a radio interface having a narrow bandwidth, a packet data convergence protocol (PDCP) layer of the second layer performs header compression to reduce the size of unnecessary control information.

A radio resource control (hereinafter, abbreviated as RRC) layer located on a lowest part of a third layer is defined in the control plane only. The RRC layer is associated with configuration, re-configuration and release of radio bearers (hereinafter, abbreviated as RBs) to be in charge of controlling the logical, transport and physical channels. In this case, the RB means a service provided by the second layer for the data transfer between the user equipment and the network. To this end, the RRC layers of the user equipment and the network exchange RRC messages with each other. If the RRC layer of the user equipment is RRC connected with the RRC layer of the network, the user equipment is in RRC connected mode. If not so, the user equipment is in RRC idle mode. A non-access stratum (NAS) layer located above the RRC layer performs functions such as session management and mobility management.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
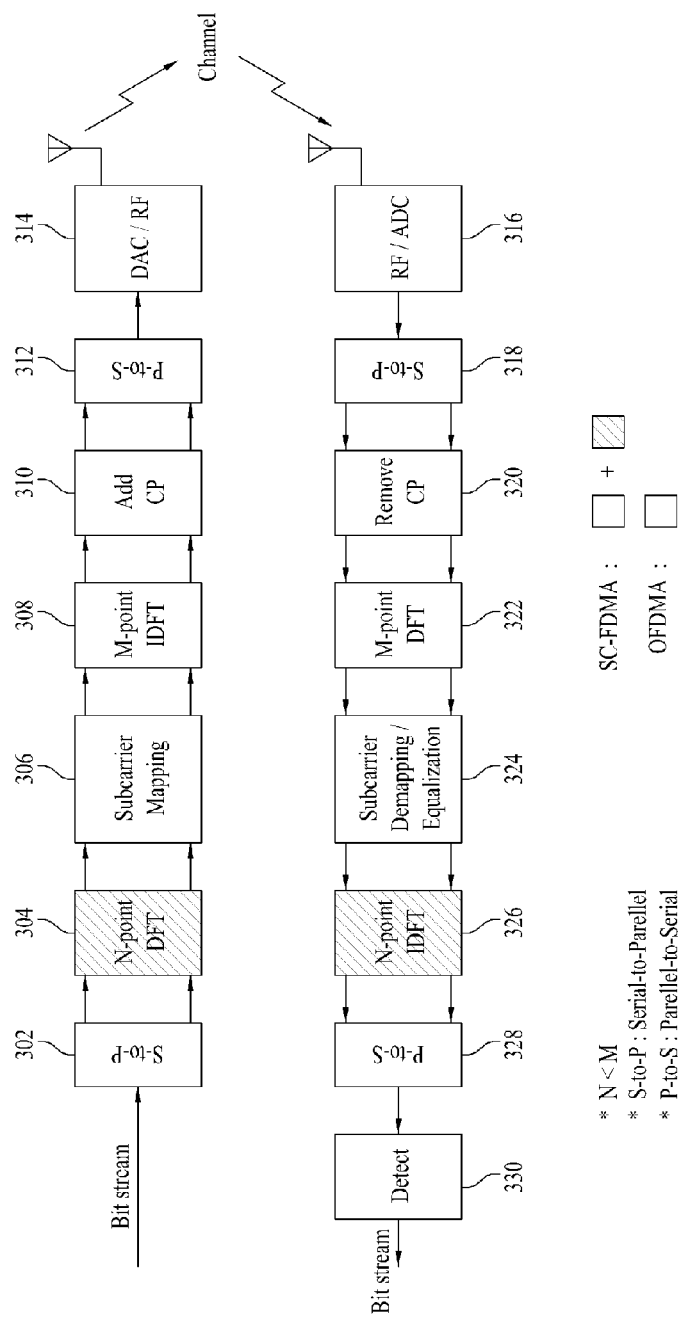
FIG. 3 is a block diagram illustrating a transmitter and a receiver for OFDMA and SC-FDMA.

FIG. 3 is a block diagram illustrating a transmitter and a receiver for OFDMA and SC-FDMA. In the uplink, transmitters 302 to 314 are parts of the user equipment, and receivers 316 to 330 are parts of the base station. In the downlink, the transmitters are parts of the base station, and the receivers are parts of the user equipment.

Referring to FIG. 3, an OFDMA transmitter includes a serial to parallel converter 302, a sub-carrier mapping module 306, an M-point inverse discrete Fourier transform (IDFT) module 308, a cyclic prefix (CP) addition module 310, a parallel to serial converter 312, and a radio frequency (RF)/digital to analog converter (DAC) module 314.

A signal processing procedure in the OFDMA transmitter will be described below. First of all, bit streams are modulated to data symbol sequences. The bit streams can be obtained by performing various signal processes, such as channel encoding, interleaving and scrambling, for a data block transferred from the MAC layer. The bit streams may be designated as codewords, and are equivalent to the data block transferred from the MAC layer. The data block transferred from the MAC layer may be designated as a transmission block. Examples of a modulation scheme include, but not limited to, BPSK(binary phase shift keying), QPSK(quadrature phase shift keying), and n-QAM(quadrature amplitude modulation). The data symbol sequences in series are converted to parallel data symbol sequences as much as N (302). N number of data symbols are mapped with N number of subcarriers allocated among a total of M number of subcarriers, and the other M-N number of carriers are padded with 0 (306). The data symbols mapped in a frequency domain are converted to time region sequences through M-point IDFT processing (S308). Afterwards, in order to reduce inter-symbol interference (ISI) and inter-carrier interference (ICI), cyclic prefix is added to the time region sequences to generate OFDMA symbols (310). The generated OFDMA symbols are converted from parallel symbols to serial symbols (312). Then, the OFDMA symbols are transmitted to the receiver through digital-to-analog conversion and frequency uplink conversion (314). Other user is allocated with available subcarriers among the remaining M-N number of subcarriers. On the other hand, the OFDMA receiver includes an RF/ADC(analog to digital converter) module 316, a discrete Fourier transform (DFT) module 322, a subcarrier demapping/equalization module 324, a parallel-to-digital converter 328, and a detection module 330. A signal processing procedure of the OFDMA receiver will be configured in reverse order of the OFDMA transmitter.

Meanwhile, as compared with the OFDMA transmitter, the SC-FDMA transmitter additionally includes an N-point DFT module 304 prior to the subcarrier mapping module 306. The SC-FDMA transmitter can reduce a peak-to-average power ratio (PAPR) of a transmitting signal more remarkably than the OFDMA transmitter by spreading a plurality of data to the frequency domain through DFT prior IDFT processing. Also, as compared with the OFDMA receiver, the SC-FDMA receiver additionally includes an N-point IDFT module 326 after the subcarrier demapping module 324. A signal processing procedure of the SC-FDMA receiver will be configured in reverse order of the SC-FDMA transmitter.

Figure 4:
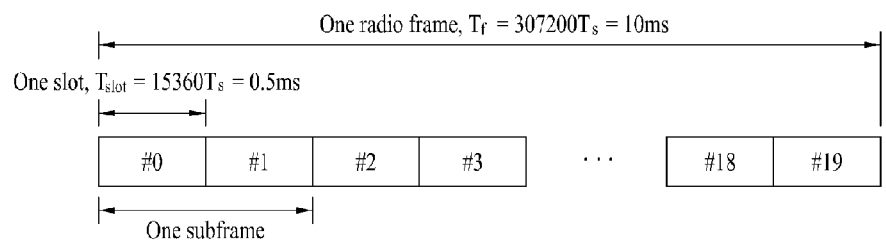
FIG. 4 is a diagram illustrating a structure of a radio frame used in an LTE system.

The modules illustrated in FIG. 4 are illustrative, and the transmitter and/or the receiver may further include necessary modules. Some modules/functions may be omitted or may be divided into different modules, and two or more modules may be incorporated into one module. A structure of a radio frame will now be described.

FIG. 4 is a diagram illustrating a structure of a radio frame used in the LTE system.

Referring to FIG. 4, the radio frame has a length of 10 ms($327200*T_s$) and includes 10 subframes of an equal size. Each sub frame has a length of 1 ms and includes two slots. Each slot has a length of 0.5 ms($15360*T_s$). In this case, $T_s$ represents a sampling time, and is expressed by $T_s=1/(15 kHz*2048)=3.2552*10^{-8}$(about 33 ns). The slot includes a plurality of OFDM symbols in a time domain, and includes a plurality of resource blocks (RBs) in a frequency domain. In the LTE system, one resource block includes twelve(12) subcarriers*seven (or six) OFDM symbols. A transmission time interval (TTI) which is a transmission unit time of data can be determined in a unit of one or more subframes. The aforementioned structure of the radio frame is only exemplary, and various modifications can be made in the number of subframes included in the radio frame or the number of slots included in the subframe, or the number of OFDM symbols included in the slot.

Figure 5:
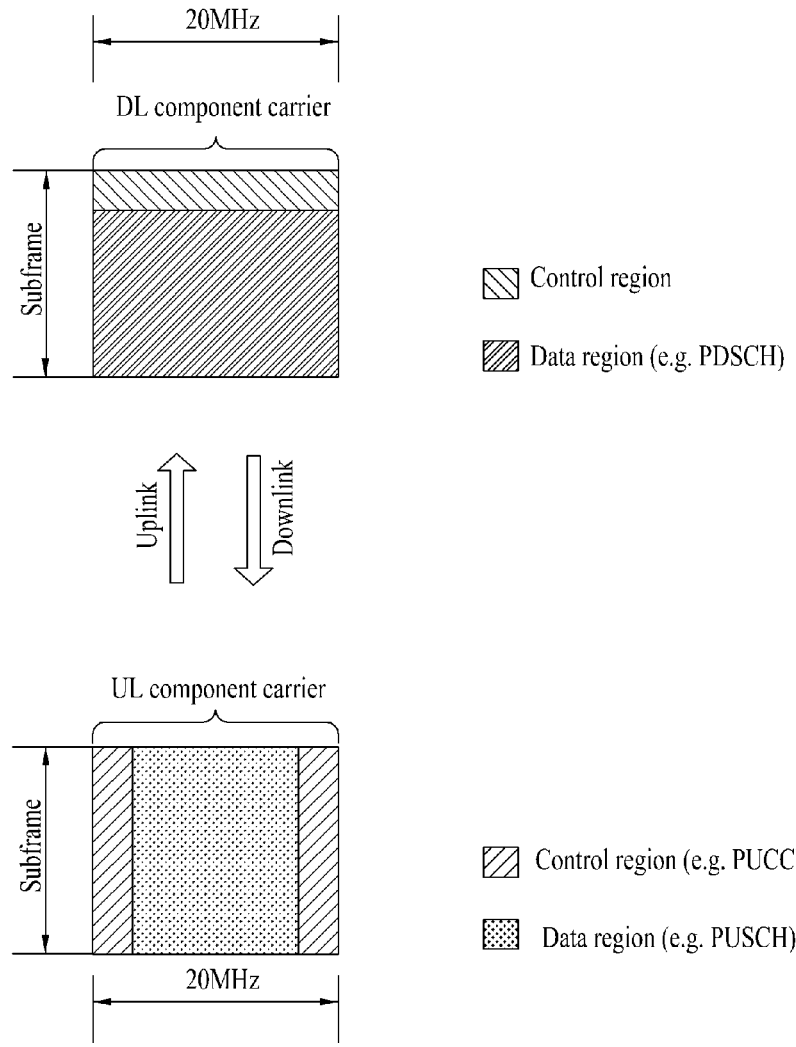
FIG. 5 is a diagram illustrating an example of communication under a single component carrier.

FIG. 5 shows an example that a communication is performed under a single component carrier. And, FIG. 5 can correspond to a communication example in LTE system.

Referring to FIG. 5, a general FDD type wireless communication system performs data transceivings on one downlink band and one corresponding uplink band. A base station and a user equipment transceive data scheduled by a subframe unit and/or control information. The data is transceived via a data region set in an uplink/downlink subframe, while the control information is transceived via a control region set in the uplink/downlink subframe. For this, the uplink/downlink subframe carries signals on various physical channels. FIG. 5 is described, for convenience, centering on the FDD type. Yet, the above description is applicable to the TDD type by dividing the radio frame shown in FIG. 4 into uplink and downlink in a time domain.

Figure 6:
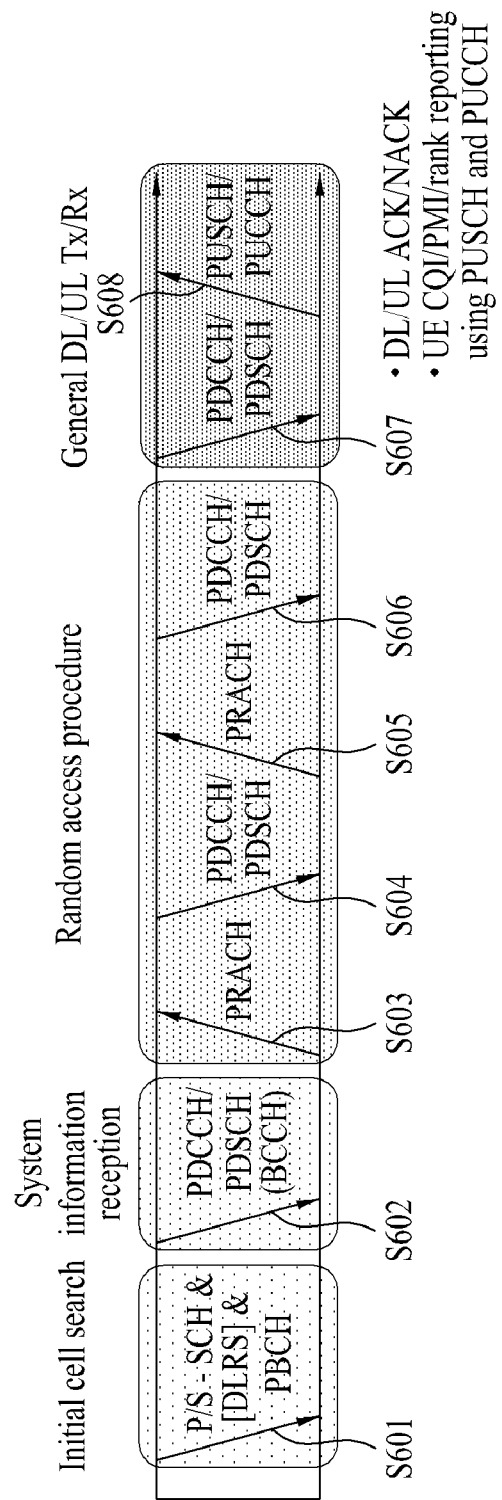
FIG. 6 is a diagram illustrating physical channels used in a 3GPP system and a method for transmitting a general signal using the physical channels.

FIG. 6 is a diagram illustrating physical channels used in a LTE system and a method for transmitting a general signal using the physical channel.

The user equipment performs initial cell search such as synchronizing with the base station when it newly enters a cell or the power is turned on (S601). To this end, the user equipment synchronizes with the base station by receiving a primary synchronization channel (P-SCH) and a secondary synchronization channel (S-SCH) from the base station, and acquires information of cell ID, etc. Afterwards, the user equipment can acquire broadcast information within the cell by receiving a physical broadcast channel from the base station.

The user equipment which has finished the initial cell search can acquire more detailed system information by receiving a physical downlink control channel (PDSCH) in accordance with a physical downlink control channel (PDCCH) and information carried in the PDCCH (S602).

Meanwhile, if the user equipment initially accesses the base station, or if there is no radio resource for signal transmission, the user equipment performs a random access procedure (RACH) for the base station (S603 to S606). To this end, the user equipment transmits a specific sequence to a preamble through a physical random access channel (PRACH) (S603 and S605), and receives a response message to the preamble through the PDCCH and a PDSCH corresponding to the PDCCH (S604 and S606). In case of a contention based RACH, a contention resolution procedure can be performed additionally.

The user equipment which has performed the aforementioned steps receives the PDCCH/PDSCH (S607) and transmits a physical uplink shared channel (PUSCH) and a physical uplink control channel (PUCCH) (S608), as a procedure of transmitting general uplink/downlink signals. The control information transmitted from the user equipment to the base station or received from the base station to the user equipment through the uplink includes downlink/uplink ACK/NACK signals, a channel quality indicator (CQI), a precoding matrix index (PMI), and a rank indicator (RI). In case of the 3GPP LTE system, the user equipment transmits control information of the aforementioned CQI/PMI/RI through the PUSCH and/or the PUCCH.

Figure 7:
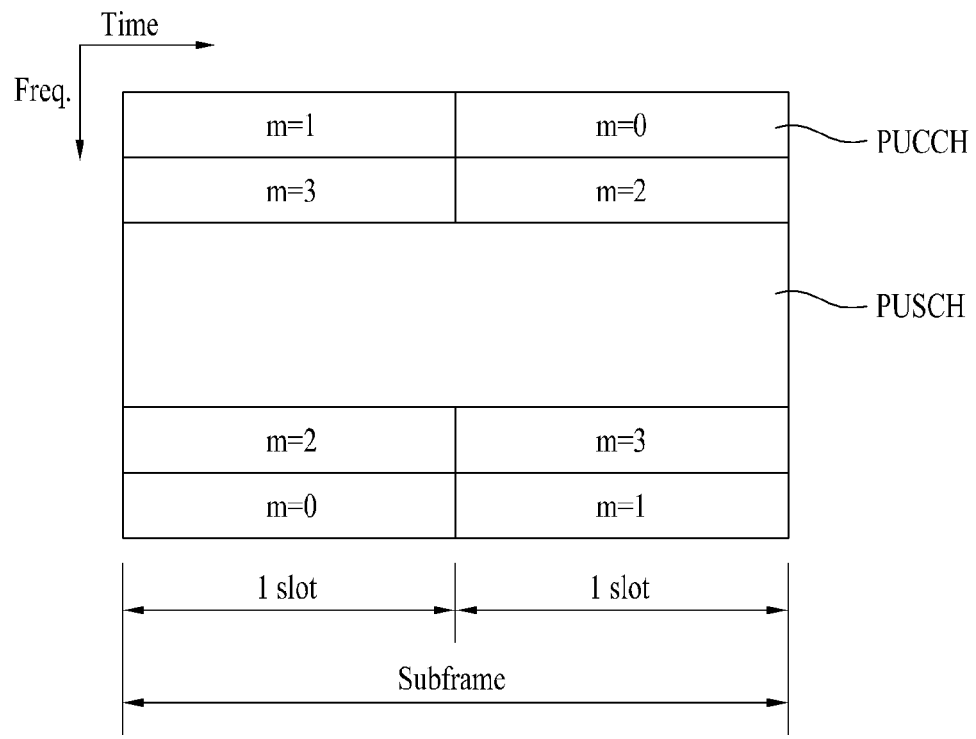
FIG. 7 is an exemplary diagram for a structure of an uplink subframe used by LTE.

FIG. 7 shows an example for a structure of an uplink subframe used by LTE.

Referring to FIG. 7, an uplink subframe includes a plurality of slots (e.g., 2 slots).

Each slot can contain SC-FDMA symbols of which number differs according to a CP length. For instance, in case of a normal CP, a slot can contain 7 SC-FDMA symbols. An uplink subframe can be divided into a data region and a control region. The data region includes PUSCH and is used to transmit a data signal of audio, video or the like. The control region includes PUCCH and is used to transmit control information. The PUCCH includes an RB pair located both ends of the data region on a frequency axis and performs hopping using a slot as a boundary. And, the control information contains HARQ ACK/NACK, CQI, PMI, RI and the like.

Figure 8:
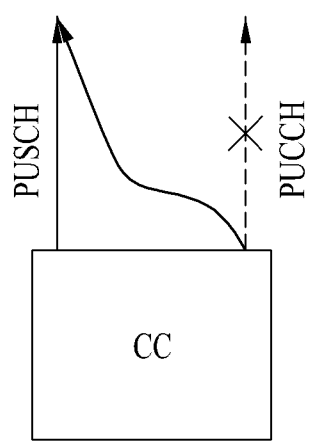
FIG. 8 is a diagram for an example of performing uplink transmission in an LTE system.

FIG. 8 is a diagram for an example of performing uplink transmission in an LTE system. The LTE system is configured in uplink to maintain a single carrier characteristic showing good properties in a PAPR (peak-to-average power ratio), a CM (cubic metric) and the like, which affect performance of a power amplifier, as in consideration of characteristics of the power amplifier of a user equipment. In the LTE system, it is able to maintain single carrier characteristics by DFT-precoded data to transmit in case of PUSCH transmission or by carrying information on a sequence having the single carrier characteristics in case of PUCCH transmission. Yet, the LTE system is unable to simultaneously transmit PUSCH and PUCCH both to maintain the single carrier characteristics. Meanwhile, in case that PUSCH for data is assigned at a timing point of transmitting control information, the control information is multiplexed with the data and is then transmitted via the PUSCH together with the data.

Figure 9:
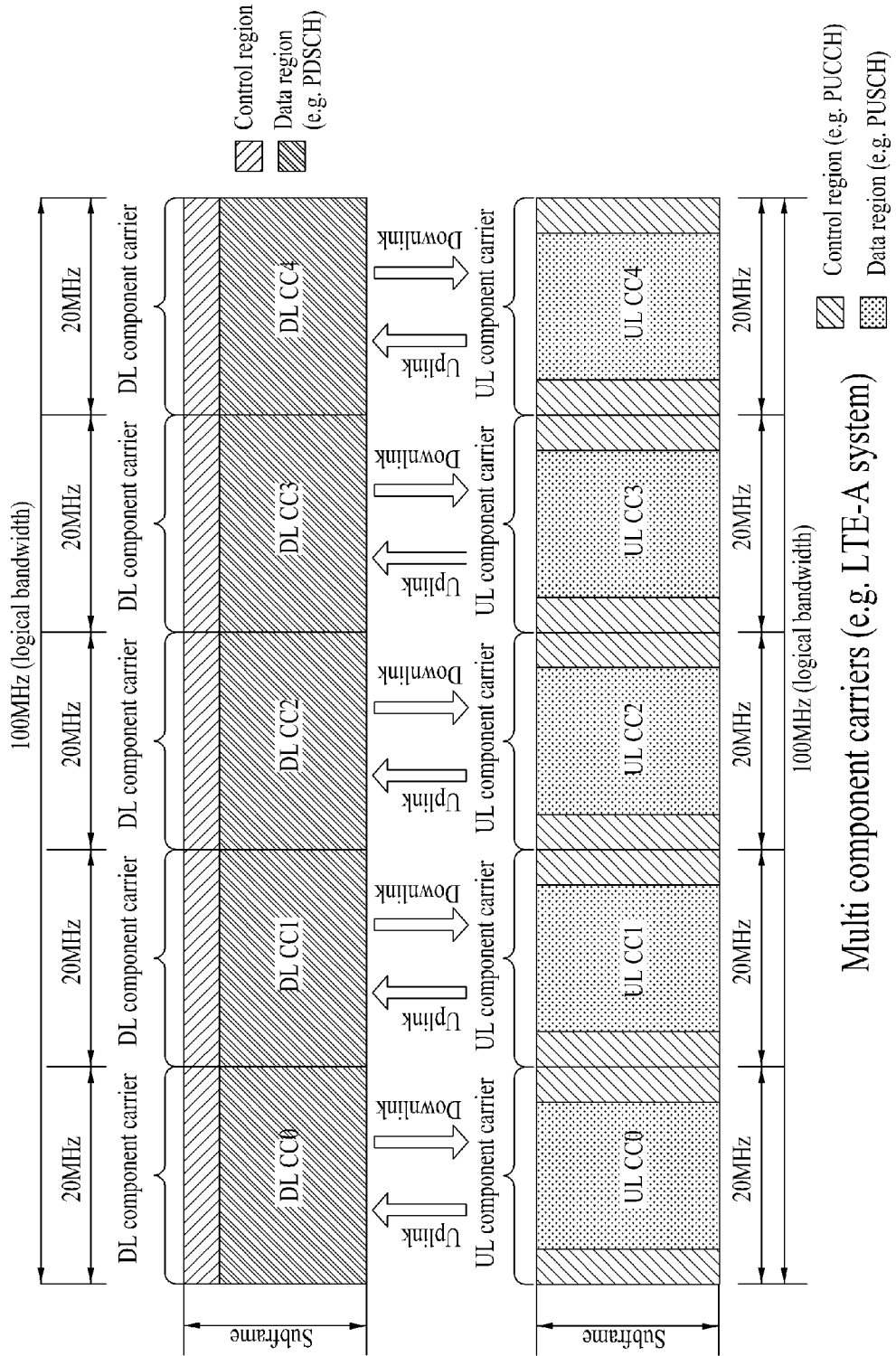
FIG. 9 is a diagram illustrating an example of communication under a plurality of component carriers.

FIG. 9 shows an example for performing communication under the circumstance of multi component carriers. And, FIG. 9 can correspond to a communication example in LTE-A system. In order to use a wider frequency bandwidth, the LTE-A system uses carrier or bandwidth aggregation that uses wider uplink/downlink bandwidth by aggregating a plurality of uplink/downlink frequency blocks together. Each of the frequency blocks is transmitted using a component carrier (CC). In the present specification, a component carrier may mean a frequency block for carrier aggregation or a center frequency of the frequency block according to a context and these terms are interchanged.

Referring to FIG. 9, 5 20 MHz CCs (component carriers) are aggregated in uplink/downlink (UL/DL) to support 100 MHz bandwidth. The CCs can be adjacent or non-adjacent to each other in a frequency domain. For clarity, FIG. 9 shows a case that a bandwidth of an UL component carrier is identical and symmetric to a DL component carrier. Yet, it is understood that a bandwidth of each component carrier can be independently determined. For example, bandwidths of an UL component carrier can be configured as 5 MHz(UL CC0)+20 MHz(UL CC1)+20 MHz(UL CC2)+20 MHz(UL CC3)+5 MHz(UL CC4). And, asymmetric carrier aggregation is possible in a manner that the number of UL component carriers is different from the number of DL component carriers. The asymmetric carrier aggregation is generated due to the limitation of available frequency band or can be artificially created by network setting. For instance, even if a whole system band is configured with N component carriers (CCs), a frequency band receivable by a specific user equipment can be limited to M component carriers (M<N). Various kinds of parameters for the carrier aggregation can be set by cell-specific, UE group-specific, or UE-specific.

Although FIG. 9 exemplarily shows that an uplink signal or a downlink signal is carried on one-to-one mapped component carrier, a component carrier actually carrying a signal may vary according to a network setting or a type of the signal. For instance, in case that a scheduling command is carried on DL CC1 in downlink, data according to the scheduling command can be carried on another DL or UL CC. Moreover, control information related to DL CC can be carried in uplink on a specific UL CC irrespective of a presence or non-presence of mapping. And, DL control information can be carried on a specific DL CC in a similar manner.

As mentioned in the foregoing description with reference to FIG. 8, the LTE system is configured to maintain single carrier characteristics in case of uplink. Yet, the LTE-A system allows a case of allocating DFT-precoded data on a frequency axis incon-secutively or a case of transmitting PUSCH and PUCCH simultaneously. In this case, it is difficult to maintain the single carrier characteristics. For instance, in a system having a plurality of CCs exist therein, as shown in FIG. 9, when PUSCH or PUCCH is carried on several CCs simultaneously, it is difficult to maintain the single carrier characteristics. In general, LTE-A user equipment is able to solve this kind of problem using a better power amplifier and the like. Yet, if a power problem of the LTE-A user equipment is caused according to a situation (e.g., a location on a cell boundary, etc.), there may exist a user equipment that should keep single carrier characteristics of a transmission signal inevitably. Therefore, it is necessary to define how to perform uplink transmission according to a situation or status of each user equipment. Moreover, signaling for performing uplink transmission is necessary as well.

Figure 10:
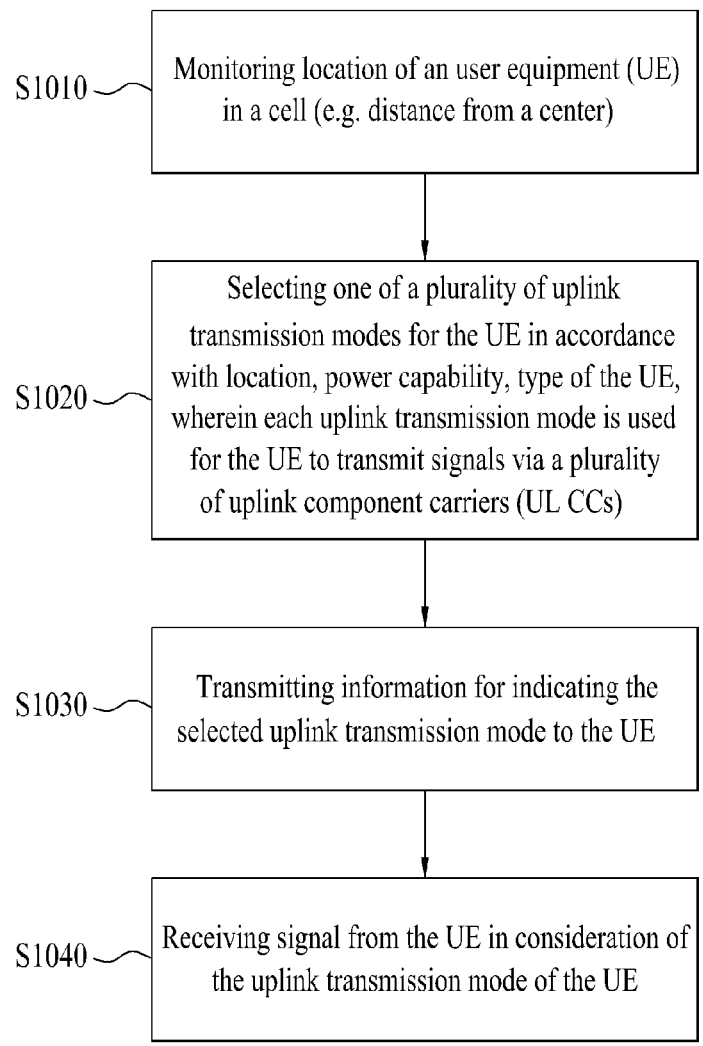
FIG. 10 and FIG. 11 are diagrams for examples of signaling uplink transmission mode of a user equipment according to an embodiment of the present invention.
Figure 11:
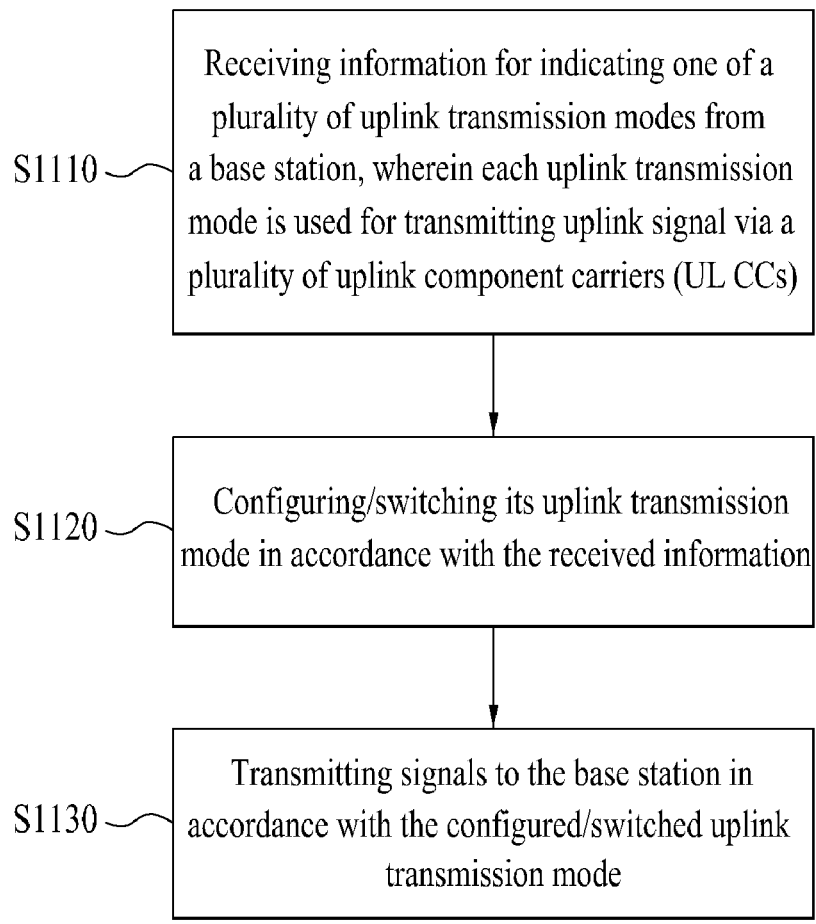

FIG. 10 and FIG. 11 are diagrams for examples of signaling a uplink transmission mode of a user equipment according to an embodiment of the present invention. FIG. 10 shows an example in aspect of a base station, while FIG. 11 shows an example in aspect of a user equipment.

Referring to FIG. 10, a base station is able to monitor a location of a user equipment (e.g., distance from a center) in a cell [S1010]. In this case, the location of the user equipment is just exemplary. The base station is able to measure, collect and/or monitor a any parameter required for determining an uplink transmission mode of the user equipment. For instance, the base station is able to measure/collect/monitor a user equipment type (e.g., LTE UE, LTE-A UE, etc.), a power capability (e.g., maximum transmission power, etc.), a UE location, a strength of a received signal, a quality of a received signal (e.g., signal-to-noise ratio (SNR), signal-to-noise and interference ratio (SINR), etc.), a size of data to schedule, a quality of service (QoS) and the like, selectively or in combination thereof.

Based on the various kinds of informations exemplarily mentioned in the step S1010, the base station is able to determine an uplink transmission mode for the corresponding user equipment from a plurality of the uplink transmission modes [S1020]. In this case, each of the uplink transmission modes is used for the user equipment to enable signals to be carried on a plurality of uplink component carriers (UL CCs). The uplink transmission mode can indicate whether a transmission having single carrier characteristics will be performed for whole UL CCs, UL CC group or each UL CC. In this case, whole uplink band can include a plurality of UL CC groups and each UL CC group can include a plurality of UL CCs. In the present specification, if single carrier characteristics are maintained, it includes a case that one physical channel is transmitted in uplink on a corresponding frequency band. Physical channels include PUSCH and PUCCH. Information mapped to PUSCH may be adjacent to each other or can be separated from each other by a cluster unit. The uplink transmission mode shall be explained in detail with reference to FIGS. 13 to 17 later. In this specification, the terminology of uplink transmission mode is defined for clarity and convenience of description. As exemplarily described in the step S1020, the uplink transmission mode can be selected from a plurality of pre-defined uplink transmission modes. Yet, it is able to directly determine whether to perform the transmission having the single carrier characteristics for whole UL CCs, each UL CC group or each UL CC.

Afterwards, the base station is able to transmit information indicating the selected uplink transmission mode to the corresponding user equipment [S1030]. As exemplarily described in the step S1020, if the uplink transmission mode can be selected from a plurality of the pre-defined uplink transmission modes, the information indicating the uplink transmission mode can have an index type. Meanwhile, if the uplink transmission mode directly indicates whether to perform the transmission having the single carrier characteristics for whole UL CCs, each UL CC group or each UL CC, the information indicating the uplink transmission mode may include the information (e.g., 1-bit) indicating whether to perform single carrier transmission per corresponding UL CC unit. The information indicating the uplink transmission mode can be signaled by a cell-specific scheme, a UE-group specific scheme or UE-specific scheme. The information indicating the uplink transmission mode can be signaled semi-statically or dynamically. The information indicating the uplink transmission mode can be signaled via a broadcast channel, an RRC message, or a downlink physical control channel (e.g., PDCCH). Afterwards, the base station is able to receive signals from the corresponding user equipment in consideration of the uplink transmission mode of the user equipment [S1040].

Referring to FIG. 11, a user equipment is able to receive information indicating one of a plurality of uplink transmission modes from a base station [S1110]. In this case, a plurality of the uplink transmission modes are used for the user equipment to transmit signals on a plurality of uplink component carriers (UL CCs), respectively. The user equipment is able to set or switch the uplink transmission mode according to the received information [S1120]. Afterwards, the user equipment is able to transmit signals to the base station according to the set uplink transmission mode [S1130].

Figure 12:
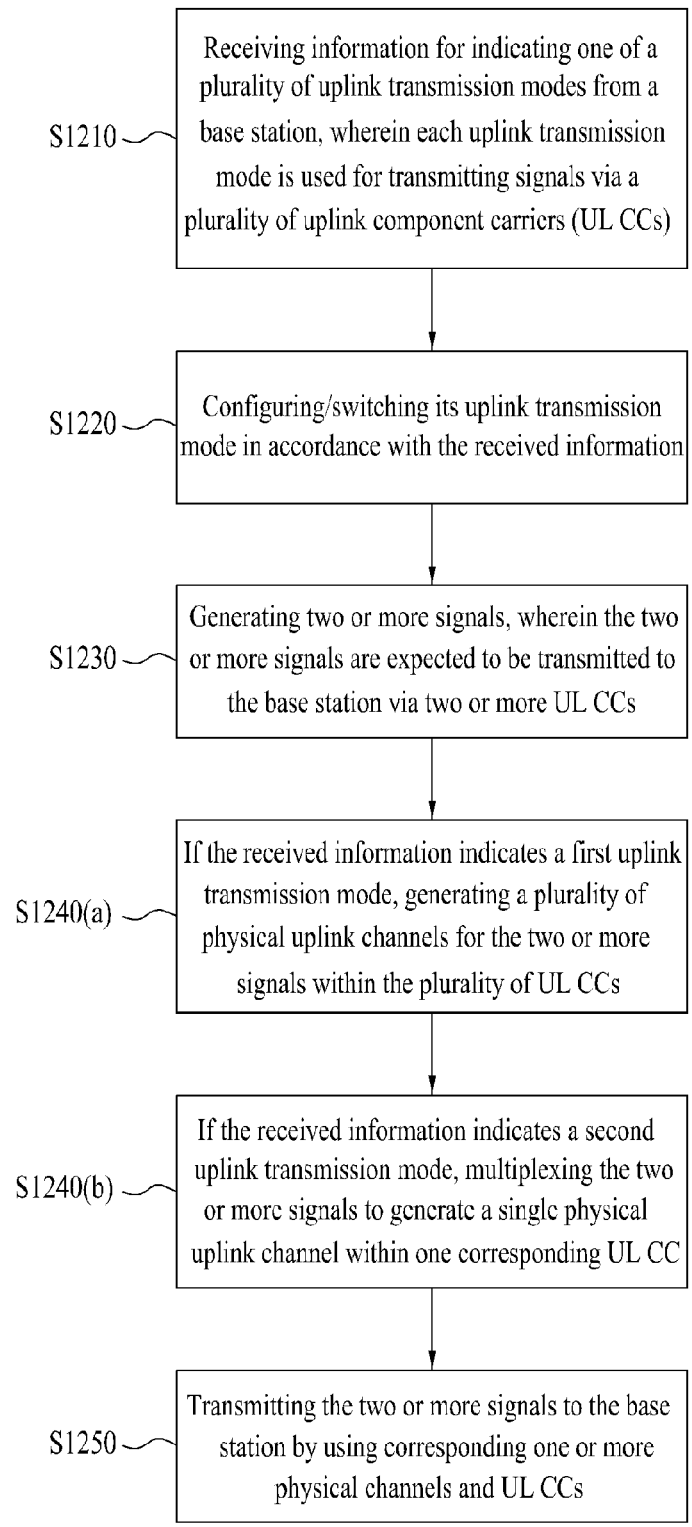
FIG. 12 is a diagram for a user equipment to perform uplink transmission according to a signaled uplink transmission mode.

FIG. 12 is a diagram for a user equipment to perform uplink transmission according to a signaled uplink transmission mode. Although FIG. 12 is exemplarily proposed in aspect of a user equipment, the example shown in FIG. 12 is symmetrically applicable to a case of a base station.

Referring to FIG. 12, a user equipment is able to receive information indicating one of a plurality of uplink transmission modes from a base station [S1210]. In this case, a plurality of the uplink transmission modes are used for the user equipment to transmit signals via a plurality of uplink component carriers (UL CCs), respectively. The user equipment is able to set an uplink transmission mode according to the received information [S1220]. The user equipment is able to generate at least two signals expected to be transmitted to the base station via a plurality of the UL CCs [S1240]. In this case, the at least two signals can indicate signals expected to be transmitted in association with different CCs. For instance, each of the signals includes a signal expected to be transmitted via a different UL CC. And, each of the signals can include a signal transmitted in association with different DL CCs, respectively. Moreover, each of the signals can include data for PUSCH transmission or control information for PUCCH transmission If the information received in the step S1210 indicates a first uplink transmission mode, the user equipment is able to generate a plurality of physical uplink channels for transmitting the at least two signals within a plurality of the UL CCs [S1240 (a)]. In particular, the first uplink transmission mode can indicate a multi-carrier transmission. Meanwhile, if the information received in the step S1210 indicates a second uplink transmission mode, the user equipment is able to generate one physical uplink channel only within the corresponding UL CC by multiplexing the at least two signals on one physical uplink channel [S1240 (b)]. In particular, the second uplink transmission mode can indicate a single carrier transmission. The physical uplink channel, in which the at least two signals are multiplexed with each other, can include PUSCH or PUCCH. For instance, if the at least two signals include data and control information both, the at least two signals can be multiplexed in the PUSCH. For another instance, if the at least two signals include control informations only, the at least two signals can be multiplexed in either PUSCH or PUCCH according to setting. The uplink transmission mode can be indicated by a unit of whole UL CCs, UL CC group or UL CC. Moreover, the uplink transmission mode can indicate multi-carrier transmission per UL CC. Afterwards, the user equipment is able to transmit the at least two signals generated in the step S1220 via the corresponding physical channel and the UL CC to the base station [S1250].

In the following description, various kinds of uplink transmission modes are exemplarily described with reference to FIGS. 13 to 17. The transmission mode exemplarily described with reference to the drawings can be signaled by various methods (e.g., the former methods described in FIGS. 10 to 12).

FIG. 13 is an exemplary diagram for a case of allowing a multiple carrier characteristic per UL CC. In case that uplink transmission is performed using a plurality of UL CCs, it is already difficult to maintain single carrier characteristics in a whole system. Therefore, in case of an LTE-A user equipment that performs uplink transmission via a plurality of UL CCs, it is not mandatory to maintain the single carrier characteristics per UL CC. According to the present embodiment, proposed is a method of transmitting PUSCH and PUCCH simultaneously without transmitting PUCCH information via PUSCH together with data in case of carrying both the PUSCH and the PUCCH on one UL CC. FIG. 13 exemplarily shows a case that PUSCH and PUCCH are simultaneously carried on one UL CC. In this case, the PUCCH information can be transmitted without an additional procedure for multiplexing the PUCCH information with data for the PUSCH transmission.

FIG. 14 (a) and FIG. 14 (b) show examples of maintaining single carrier characteristics per UL CC in case that a plurality of UL CCs exist. Referring to FIG. 14 (a), in case that PUSCH or PUCCH is sent per UL CC, it is able to transmit the PUSCH or PUCCH by maintaining single carrier characteristics per UL CC. Referring to FIG. 14 (b), in case that a UL CC carrying PUSCH and PUCCH simultaneously exists, an LTE-A user equipment even enables a corresponding UL CC to carry PUCCH information together with data on PUSCH like LTE. In case that the PUCCH information is transmitted together with the data via the PUSCH, it is able to follow the method defined by the LTE for multiplexing the PUCCH information and the data with each other [cf. 3GPP TS 36.212, Evolved Universal Terrestrial Radio Access (E-UTRA); Multiplexing and channel coding (Release 8)].

Meanwhile, in LTE-A, a plurality of PUCCHs can be carried on one UL CC. In this case, a plurality of PUCCH informations are transmittable together with data via PUSCH. And, a method of multiplexing a plurality of the PUCCH informations and the data together is easily extensible from the multiplexing method defined by the LTE. Specifically, it may happen that PUSCH for data transmission is not assigned since there is no data to transmit, despite that it is necessary for a plurality of PUCCHs to be carried on one UL CC. In this case, it is able to consider PUSCH assignment for a plurality of PUCCH informations only. If so, the PUCCH information is not sent together with data via PUSCH. Instead, a plurality of PUCCH informations are multiplexed and are then carried on a corresponding PUSCH. In doing so, information indicating that the corresponding PUSCH is used not for the data transmission but for the transmission of the PUCCH informations only can be announced via an uplink scheduling grant for PUSCH assignment. Specifically, information on a usage of PUSCH can include 1-bit information. Through the 1-bit information, it is able to signal whether the corresponding PUSCH is the PUSCH used to transmitting control channels only. For another instance, even if it is necessary to transmit a plurality of PUCCHs via one UL CC, if there is no data to transmit, a plurality of PUCCH informations can be transmitted by being multiplexed into one PUCCH (not shown in the drawing).

FIG. 15 is an exemplary diagram for a case of maintaining a multiple carrier characteristic per UL CC in case of performing uplink transmission via MIMO antenna. As mentioned in the forgoing description, in case that the PUCCH information is transmitted together with the data via the PUSCH, the method for multiplexing the PUCCH information and the data with each other is defined by the LTE system. Moreover, a method of multiplexing a plurality of PUCCH informations into PUSCH is easily applicable by extending a conventional method. Yet, in case that MIMO antenna transmission scheme (e.g., SU-MIMO (Single-User Multiple Input Multiple Output)) is applied to uplink transmission, it is difficult to multiplex PUCCH information into PUSCH by the same method of the related art method. And, if data is carried as multi-carrier, complexity may be considerably raised. And, the LTE system fails to define the SU-MIMO transmission in uplink. Therefore, in case that SU-MIMO is applied, a new method is needed to multiplex data and a control channel together. Yet, due to system complexity and the like, if SU-MIMO applied PUSCH transmission is scheduled at a timing point of transmitting PUCCH information, a method of dropping control channel information can be taken into consideration. In particular, in case of SU-MIMO, it is able to transmit data via PUSCH only. Meanwhile, although FIG. 15 exemplarily shows a case of giving up the PUCCH information, in case that multiplexing of data and PUCCH information is difficult due to SU-MIMO and the like, it is able to give up data transmission via PUSCH. In case of data, since retransmission is possible by HARQ or ARQ scheme, it is able to secure transmission reliability.

FIG. 16 and FIG. 17 are exemplary diagrams for a case of maintaining single carrier characteristics for a plurality of UL CCs. In case of receiving downlink information via a plurality of DL CCs, a user equipment is able to transmit ACK/NACK information on a plurality of downlink data receptions and downlink channel information on a plurality of DL CCs via a corresponding UL CC in uplink in the uplink transmission mode exemplarily shown in one of FIGS. 13 to 15. Yet, as mentioned in the foregoing description, as a power problem is even generated from an LTE-A user equipment according to a situation (e.g., location on a cell boundary, etc.), it may be necessary to maintain single carrier characteristics for a plurality of UL CCs inevitably. In this case, the user equipment is able to consider that ACK/NACK information on a plurality of the downlink data receptions and downlink channel information on a plurality of the DL CCs are transmitted in uplink via one UL CC among whole (available/allocated) UL CCs or a UL CC group. For instance, a base station is able to inform a corresponding user equipment that data transmission can be performed via one UL CC among the whole (available/allocated) UL CCs or the UL CC group only. If so, the corresponding user equipment just performs uplink data transmission via PUSCH of the UL CC signaled by the base station. In doing so, if there is control information to be transmitted via PUCCH of another UL CC or the same UL CC, the corresponding information can be transmitted by being multiplexed in the signaled PUSCH. Meanwhile, in case that PUCCHs of different UL CCs are multiplexed into one PUSCH, the corresponding PUSCH can further include identification information for indicating a UL CC associated with the multiplexed PUCCH.

FIG. 16 (*a*) exemplarily shows a case that single carrier characteristics are maintained for whole UL CCs. Referring to FIG. 16 (*a*), control information, which should be carried on PUCCH of other UL CCs (UL CC1, UL CC4) as well as UL CC2, can be transmitted together with data via PUSCH of the UL CC2. By this method, a user equipment is able to simultaneously transmit control channel information on a plurality of UL CCs and data while maintaining single carrier characteristics. The UL CC carrying a multiplexed signal can include the UL CC having a PUSCH transmission assigned thereto at a corresponding timing point. In this case, the UL CC carrying the multiplexed signal can be changed according to an uplink scheduling command. And, the UL CC carrying the multiplexed signal can include a specific UL CC selected to transmit an uplink signal. The specific UL CC can be directed to the user equipment via RRC signaling. In this case, the uplink scheduling command is limited to indicate the specific UL CC at any case or may not include the information on the scheduled UL CC.

Even if a user equipment, which should maintain single carrier characteristics, needs PUCCH transmission via a plurality of UL CCs, PUSCH for data transmission may not be assigned because there is no data to transmit. In this case, it is able to consider that PUSCH shall be assigned to multiplex control channel informations only. Therefore, control channel informations, which will be carried on PUCCH of a plurality of UL CCs, are multiplexed only and then transmitted via corresponding PUSCH. For instance, the PUSCH of the UL CC2 can be considered to be assigned to carry control channel only instead of data transmission. In this case, information indicating that the corresponding PUSCH is used to transmit control channels only instead of data transmission can be announced via an uplink scheduling grant for PUSCH assignment. Specifically, the information on a usage of PUSCH can include 1-bit information. Through the 1-bit information, it is able to signal whether the corresponding PUSCH is the PUSCH used to transmit control channels only. For another instance, even if a plurality of PUCCH transmissions via a plurality of UL CCs are necessary, if there is no data to transmit, a plurality of PUCCH informations are multiplexed into one specific PUCCH and can be then transmitted (not shown in the drawing). In this case, the one specific PUCCH can further include identification information for indicating a CC associated with the multiplexed PUCCH information.

For easy understanding, this embodiment exemplifies one PUCCH transmission occurs per UL CC. However this embodiment can be easily extended to a situation when there are a plurality of PUCCH transmissions. For example, if the user equipment needs to transmit one or multiple PUCCH through one UL CC, the PUCCH(s) may be piggybacked to a PUSCH of the same UL CC when there is a PUSCH transmission on the same UL CC. Similarly, in this case, the PUCCH(s) may be piggybacked to a PUSCH of a different UL CC when there is no other PUSCH than the piggybacked PUSCH. If there are a plurality of PUSCH, a PUSCH used for piggybacking is determined using a priority of UL CCs. For example the priority can be explicitly signaled using broadcasting or RRC signaling. Alternatively, the priority can be implicitly determined/signaled in consideration of on which UL CC PUCCH is allocated, index of UL CC, etc. For example, PUSCH of a UL CC on which one or more PUCCH are allocated may have top priority. In brief, PUCCH(s) may be limited to be transmitted through only one UL CC.

FIG. 16 (*b*) exemplarily shows a case that single carrier characteristics are maintained by a unit of UL CC group. Referring to FIG. 16 (*b*), two UL CC groups exist (UL CC group 1: UL CC0~UL CC1/UL CC group 2: UL CC2~UL CC4). And, control information in each UL CC group can be transmitted in uplink via PUSCHs of the UL CC1 and the UL CC3. The number of UL CC groups and the number/index of UL CCs constructing each of the UL CC groups can be set semi-statically or dynamically according to a channel status or a network setting. And, the information on the UL CC group can be notified to the user equipment via a broadcast channel, RRC signaling, downlink control channel (e.g., PDCCH) and the like.

FIG. 17 is an exemplary diagram for a case of maintaining a single carrier characteristic for a plurality of UL CCs in case of performing uplink transmission via MIMO antenna. FIG. 17 (a) and FIG. 17 (b) correspond to FIG. 16 (a) and FIG. 16 (b), respectively. In case of performing an uplink transmission via MIMO antenna, a method of maintaining single carrier characteristics is basically identical to that described with reference to FIG. 15. FIG. 17 (a) exemplarily shows a case that an MIMO antenna transmission scheme (e.g., SU-MIMO) is not used for PUSCH transmission of UL CC2. In this case, control information of other UL CC including the UL CC2 is multiplexed into PUSCH of the UL CC2 and can be then transmitted in uplink. FIG. 17 (b) shows a case that the MIMO antenna transmission scheme (e.g., SU-MIMO) is not applied to a UL CC group 1 (UL CC0~UL CC1) and that the MIMO antenna transmission scheme (e.g., SU-MIMO) is applied to a UL CC group 2 (UL CC2~UL CC4). Uplink transmission via the UL CC group 1 is the same as exemplarily shown in FIG. 16 (b). Yet, in case of the UL CC group 2, as exemplarily shown in FIG. 15, it is able to drop PUCCH information if multiplexing of data and PUCCH information is necessary. Although FIG. 17 (b) exemplarily shows a case of giving up PUCCH information, if it is difficult to multiplex data and PUCCH information together due to SU-MIMO and the like, it is able to give up the data transmission via PUSCH. In case of data, as retransmission is possible by HARQ scheme or ARQ scheme, transmission reliability can be secured.

FIG. 18 is a diagram for an example of a base station and a user equipment applicable to one embodiment of the present invention.

Referring to FIG. 18, a wireless communication system includes a base station (BS) 110 and a user equipment (UE) 120. In downlink, a transmitter is a part of the base station 110 and a receiver is a part of the user equipment. The base station 110 includes a processor 112, a memory 114 and a radio frequency (RF) unit 116. The processor 112 can be configured to implement procedures and/or methods proposed by the present invention. The memory 114 is connected to the processor 112 and stores various kinds of informations associated with operations of the processor 112. The RF unit 116 is connected to the processor 112 and transmits and/or receives radio signals. The user equipment 120 includes a processor 122, a memory 124 and an RF unit 126. The processor 122 can be configured to implement procedures and/or methods proposed by the present invention. The memory 124 is connected to the processor 122 and stores various kinds of informations associated with operations of the processor 122. The RF unit 126 is connected to the processor 122 and transmits and/or receives radio signals. The base station 110 and/or the user equipment 120 can have a single antenna or a multi-antenna.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

Accordingly, the present invention is applicable to a wireless communication system. Particularly, the present invention is applicable to a method and apparatus for uplink transmission in carrier aggregation environment.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method of controlling uplink transmission by a user equipment in a wireless communication system, the method comprising:

configuring a transmission mode for a PUSCH (Physical Uplink Shared Channel) as one of a SU-MIMO (Single User Multiple Input Multiple Output) mode and a Non-SU-MIMO mode; and performing a procedure for UCI (Uplink Control Information) transmission at a subframe, wherein the UCI needs to be transmitted at the subframe, wherein, if the SU MIMO mode is configured and if there is allocation of a PUSCH at the subframe, transmission of the UCI is dropped at the subframe, and wherein, if the Non-SU-MIMO mode is configured and if there is allocation of a PUSCH at the subframe, the UCI is transmitted via the PUSCH at the subframe.

2. The method of claim 1, wherein, if the SU-MIMO mode is configured and if there is allocation of the PUSCH at the subframe, the PUSCH is transmitted at the subframe and carries a plurality of layers for data.

3. The method of claim 1, wherein, if the Non-SU-MIMO mode is configured and if there is allocation of the PUSCH at the subframe, the UCI is multiplexed with data and transmitted via the PUSCH at the subframe.

4. The method of claim 1, wherein the user equipment is configured so as to allow a transmission of only one physical uplink channel over a set of component carriers.

5. A user equipment configured to control uplink transmission in a wireless communication system, the user equipment comprising:

a radio frequency unit; and a processor, wherein the processor is configured to:

configure a transmission mode for a PUSCH (Physical Uplink Shared Channel) as one of a SU-MIMO (Single User Multiple Input Multiple Output) mode and a Non-SU-MIMO mode, and perform a procedure for UCI (Uplink Control Information) transmission at a subframe, wherein the UCI needs to be transmitted at the subframe, wherein, if the SU-MIMO mode is configured and if there is allocation of a PUSCH at the subframe, transmission of the UCI is dropped at the subframe, and wherein, if the Non-SU-MIMO mode is configured and if there is allocation of a PUSCH at the subframe, the UCI is transmitted via the PUSCH at the subframe.

6. The user equipment of claim 5, wherein, if the SU-MIMO mode is configured and if there is allocation of the PUSCH at the subframe, the PUSCH is transmitted at the subframe and carries a plurality of layers for data.

7. The user equipment of claim 5, wherein, if the Non-SU-MIMO mode is configured and if there is allocation of the PUSCH at the subframe, the UCI is multiplexed with data and transmitted via the PUSCH at the subframe.

8. The user equipment of claim 5, wherein the user equipment is configured so as to allow a transmission of only one physical uplink channel over a set of component carriers.

* * * * *